350-378 SR
XR 3,059,538
CROSS REFERENCE SEARCH ROOM

MAGNETO-OPTICAL INFORMATION STORAGE UNIT

Filed June 12, 1957 2 Sheets-Sheet 1

STORAGE UNIT

INVENTORS R. C. SHERWOOD
H. J. WILLIAMS
BY Harry C. Hart
ATTORNEY

INVENTORS R. C. SHERWOOD
H. J. WILLIAMS
BY Harry C. Hart
ATTORNEY 3,059,538
Patented Oct. 23, 1962

3,059,538

MAGNETO-OPTICAL INFORMATION STORAGE UNIT

Richard C. Sherwood, New Providence, and Howell J. Williams, Chatham, N.J., assignors to Bell Telephone Laboratories, Incorporated, New York, N.Y., a corporation of New York Filed June 12, 1957, Ser. No. 665,156
13 Claims. (Cl. 88—61)

This invention relates to the storage and recovery of information. It has for its principal object to record and store information without assistance from the human hand and to recover any selected item of the information thus stored without assistance from the human eye. A related object is to store large numbers of such items of information in a small space. Another related object is to provide a tabular "dictionary" of code translations in a small space.

Needs exist in widely separated fields for information storage and recovery of this sort. A problem of telephony will serve as an illustration.

The ever-increasing complexity of communication systems and media such as the telephone network involves the performance of large numbers of operations, many of which can be regarded as translations from one code language to another. These operations are normally carried out by apparatus components which are interconnected by electrical energy paths. Each time a change is made in the numerical designation of a calling party, a called party, a line finder, a register, or the like, one or more of these energy paths must be altered or rerouted, and the ramifications of the network are at present increasing at such a rapid pace as to make the carrying out of these energy path changes a substantial burden.

This situation has led to proposals for compiling large numbers of items of pretranslated information in a suitable store, into which it may be readily written and from which it may readily be read out by suitable electrical or optical means. An incoming call can then direct the reading element to a particular location of this store, designated by X and Y coordinates that are specific to the called party's telephone number, whereupon the reading element may extract from the store such prerecorded information as is necessary to complete the call. When a designation change of the type referred to above is required, it is only necessary to erase the original stored information and to replace it by its new counterpart. In general, no alteration of the energy path connections is required.

This new approach to the instrumentation of a telephone central office is described in an application of R. C. Davis and R. E. Staehler, Serial No. 541,195, filed October 18, 1955, now U.S. Patent No. 2,830,285, granted April 8, 1958. In the system there described, the storage unit proper is a photographic film. Information is "written" into it by exposure and development. The stored information is "read" out of it by the passage through it of a beam of light.

Aside from the time consumed in the development of the photographic film, an obvious weakness of the film is that the change of any single item of recorded information means an entire new film: it is impossible to erase part of the image on an exposed photographic film and replace it with a new part image.

Accordingly, it is a specific object of the present invention to provide for the ready substitution, in an information store of the type suitable as a component of the Davis-Staehler system, of any new item of information for an old one, without in any way affecting the other stored items.

These and other objects are attained, in accordance with illustrative embodiments of the invention by the provision, on a suitable base such as a glass plate, of a film of a material which is transparent to light, of which the magnetocrystalline anisotropy is high, of which the axis of easy magnetization is normal to the film surface, and of which the coercivity is fairly high, but not excessive. The film should be so thin as to transmit a significant fraction of a beam of plane-polarized light incident normally on it, and yet sufficiently thick to produce a rotation of the plane of polarization through an angle $\beta$ of significant magnitude. A film of an intermetallic compound such as manganese bismuth, of which the component crystals are suitably oriented, and of a thickness of the order of 1,000 Angstrom units has the required properties. It transmits about 20 percent of the light normally incident on it in the visible range and it rotates the polarization plane by about five degrees.

One process, though of course not the only one, by which the new film may be fabricated is by the vapor deposition in a vacuum of a layer of manganese on a glass plate and to follow this step by a similar vapor deposition of bismuth on the layer of manganese. These two depositions are followed by a heat treatment in the course of which the two metals become intimately mingled, crystallization of the intermetallic compound takes place and the crystals grow laterally along the surface of the glass plate.

As a consequence of the crystal structure the axis of easy magnetization of each such crystal, in this case the optic or "*c*" axis, extends perpendicularly to the face of the crystal and hence to the surface of the plate. When first formed the film is found to contain a number of fairly large magnetic domains throughout each of which the magnetic polarity is uniform, but such that the polarities are different in adjacent domains. The elementary magnets of which the film is composed may all be brought into alignment by subjecting the film to a uniform steady magnetic field of a strength of 3,000 oersteds or more. As thus fabricated and magnetized the film now transmits about 20 percent of the plane-polarized light incident on it and rotates the plane of polarization through an angle $\beta$ of about five degrees.

Information may now be written on this film by reversing the magnetic polarity of one or more of the elementary magnets or crystals of which the film is composed. To this end a magnetic stylus having a sharp tip at which the field strength is substantially in excess of 3,000 oersteds may be brought into contact with the film. The stylus may be a permanent magnet of the material known in the trade as "Vicalloy," or it may be an electromagnet of a vanadium-iron-cobalt alloy such as that known in the trade as "Superendur." Those parts of the film which have been subjected to the high field of the tip of the stylus, and only those parts, are reversed in polarity and consequently they act to rotate the plane of polarization of incident light in the opposite direction to that of the unaffected parts of the film. Hence, when the film is placed between a polarizer and an analyzer, the plane of polarization of the light energizing from the affected parts is rotated, with respect to the plane of polarization of the light emerging from the unaffected parts, by $2\beta$ or ten degrees; and when the polarizer and the analyzer are adjusted for extinction of the light from the affected parts, the unaffected parts still transmit a substantial fraction of the incident light. Hence the "writing" appears as dark marks on a bright background.

If the analyzer be rotated through an angle $2\beta$ (in this case ten degrees in the opposite direction), the situation is reversed and the affected parts appear as bright marks on a dark background. Of course, the same result may be produced by rotating the polarizer instead of, or in addition to, the analyzer. The magnetic coercivity and crystalline properties of the film of the invention are such that the writing may take the form of extremely fine lines or other marks; indeed 1,000 distinguishable lines to the linear centimeter or 1,000,000 distinguishable dots in a single square centimeter.

Because of the nonlinear relation which holds between magnetic flux and magnetizing force with the material of the new film, as with all known ferromagnetic materials, it is best operated between saturation in one direction and saturation in the other direction. Hence it lends itself readily to use in a system in which the information to be stored and read out is in the form of binary digits or bits. An example of its use in such a system will be described in greater detail below.

The writing may readily be erased simply by a repetition of the writing operation with the polarity of the stylus tip reversed. With restoration of the stylus tip to its original writing polarity new marks may be placed on the film in precisely the same locations as those in which the original marks appeared. Hence information stored in any particular part of the film may be replaced at will by new information without in the least affecting the other parts of the film or altering the information stored on them.

A film of a thickness which suffices to rotate a significant amount the polarization plane of light transmitted by it is not infinitely transparent. Indeed, of the light incident on a manganese-bismuth film of $\frac{1}{10}$ micron thickness about 20 percent passes through the film, a substantial portion is reflected back toward the light source by the film, and another small portion is absorbed. The polarization plane of the reflected component is rotated, just as is that of the transmitted component. Rotation of the polarization plane of the transmitted component takes place by virtue of the phenomenon known as the Faraday effect, and rotation of the polarization plane of the reflected component takes place by virtue of the phenomenon known as the Kerr effect. Hence information written into the storage unit with a magnetic stylus may, if preferred, be read out by reflected light as well as by transmitted light.

The invention will be fully apprehended from the following detailed description of a preferred illustrative embodiment thereof taken in connection with the appended drawings in which.

Figure 1:
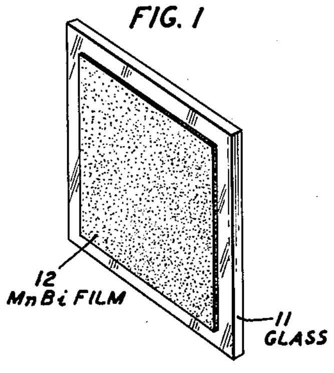
FIG. 1 is a perspective diagram showing an information storage unit in accordance with the invention.

Referring now to the drawings, FIG. 1 shows a supporting plate 11 of a transparent material such as glass bearing on one face a thin film 12 of a transparent, polarization-rotating material of high magnetocrystalline anisotropy such as an intermetallic compound of manganese and bismuth sometimes known as manganese-bismuthide.

Figure 2:
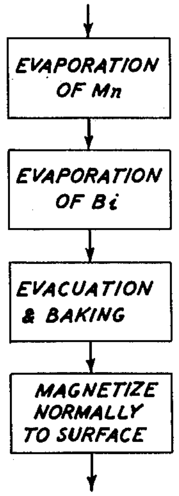
FIG. 2 is an operational diagram showing the steps of a method that may be employed for producing an information storage unit in accordance with the invention.

This film may be fabricated in place on the backing plate by following the procedure indicated in FIG. 2. Excellent films have been fabricated by this process as set forth in greater detail below.

The glass backing plate, after being appropriately cleaned, is placed in an evaporation chamber containing a source of manganese vapor. The chamber is thereupon evacuated and a manganese source is heated to evaporate or "sputter" manganese in a thin layer, perhaps 500 Angstrom units in thickness, over one face of the plate. This process is then repeated with a source of bismuth vapor. The steps are taken in this sequence because of the fact that the boiling point of bismuth is lower than that of manganese. The atoms of the two components should, for best results, appear together on the backing plate as nearly as possible in equal numbers or, in other words, the components should be present in proportion to their atomic weights. This provides the necessary constituents for the formation of the compound with a minimum of excess of either ingredient over the other.

The evaporation chamber containing the plate, bearing the admixed manganese and bismuth, may now be baked at a temperature of about 200 degrees centigrade for one-half hour or so while being very thoroughly evacuated. When the pressure in the vacuum chamber has been reduced to about 0.15 micromillimeter of mercury ($1.5\times10^{-7}$ mm. Hg) the entrance and exit ports of the chamber are sealed off to hold the vacuum. Thereupon the temperature of the entire system is raised to about 300 degrees centigrade and is held at that temperature for several days. It is this long slow baking process which is believed to be responsible for the formation of the manganese-bismuth compound in crystalline form and, in addition, for the growth of the crystals in an orientation which makes for best results.

Without necessary subscription to any particular theory, it is surmised that the origins of the favorable characteristics of the new film are to be found in the following considerations:

The intermetallic compound manganese bismuthide adopts the same hexagonal lattice structure as does nickel arsenide. Its magnetocrystalline anisotropy is high and the axis of easy magnetization coincides with the hexagonal (or "$c$") axis. In the prescribed preparation of the film, the crystals tend to grow with their hexagonal axes normal to the plate on which the crystals are grown. Thus the crystal growth, which takes place during the baking process, acts to produce a film in which the "$c$" axes of the great majority of the crystals are normal to the film surface.

In any event it can readily be determined that films prepared in this fashion contain magnetic domains of substantial extent throughout each of which the elementary magnetic poles or electron spins are oriented in the same direction, while the corresponding poles or spins in an adjacent domain are oriented in the opposite direction. As a consequence in two adjacent domains, the magnetic vector may point outward from the film surface in one domain and inward into the film surface in an adjacent domain.

It is characteristic of manganese-bismuthide that it rotates the plane of polarization of incident plane-polarized light in one direction or the other in dependence on the direction of the local magnetic vector. The angle $\beta$ of such rotation depends, of course, for any particular film, on its thickness.

While any single domain of the film as thus fabricated may serve for the practice of the invention, it is preferred to ensure that the entire film surface, over as great an area as may be desired, shall initially be of the same vector magnetization. To ensure this result it is preferred to follow the baking process by a magnetization step as indicated in the fourth box of FIG. 2. Because the coercivity of the crystals of the film is of the order of 3,000 oersteds the magnetizing field must exceed this figure. However, because the magnetization is normal to the film and the film and its backing plate are together very thin, the application of a magnetizing field of this strength presents no serious problem. The film and its backing plate together may be placed between the poles of an electromagnet which are separated by a narrow air gap, just sufficient to admit the backing plate bearing its film.

Application of this magnetizing field to the film reverses the magnetization vector of some of the domains, leaving the vectors of others of the domains unchanged. Upon the completion of this step of the process the film is uniformly magnetized throughout its area, the magnetization vectors of all parts of the film being alike not only in magnitude and in orientation, but in polarity as well. Hence, when the baked and magnetized film is placed between the analyzer and the polarizer, all parts of it rotate the plane of polarization of the incident light through the same angle $\beta$ and, for any orientation of the analyzer with respect to the polarizer the film is uniform in appearance, and for a particular orientation, the entire film appears uniformly bright. Information may now be written onto it with a localized magnetic field, which may comprise, for example, a magnetic stylus, which inverts the polarity only of those of its elementary magnets with which the stylus is brought into very close juxtaposition. These affected parts rotate the polarization plane of the incident light through the same angle $\beta$, but in the opposite direction. With a stylus having a needle-sharp tip it is feasible to write exceedingly minute magnetic marks on the film, indeed, as many as 1,000 distinguishable marks to the centimeter or 1,000,000 distinguishable marks in a single square centimeter. A film bearing such marks may be read in the fashion described above, preferably, though not necessarily by adjusting the analyzer for extinction of the light transmitted through the affected parts of the film, in which case the visual contrast between the light transmitted through the unaffected parts and that transmitted through the affected parts is maximized.

Figure 3:
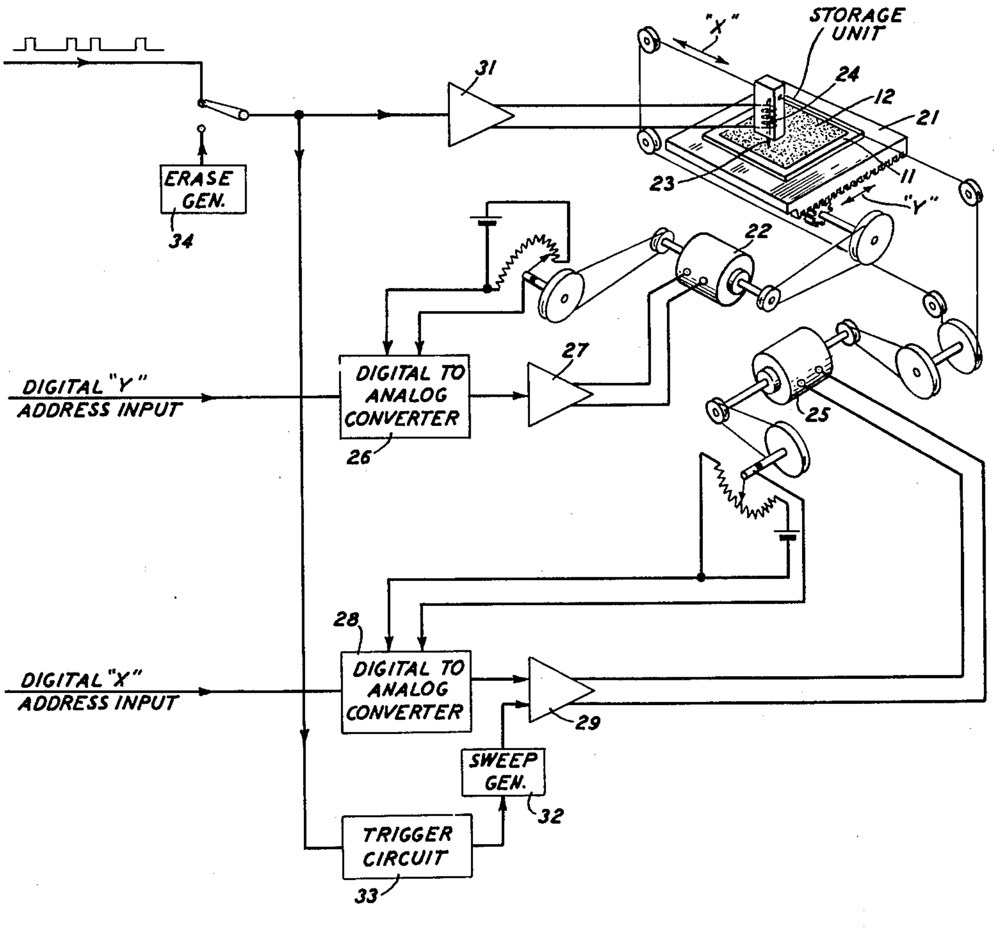
FIG. 3 is a schematic circuit diagram, partly in block form and partly in perspective, showing apparatus for writing information into the storage unit at a particular location.

The magnetic characteristics of the storage unit of the invention are such that each part of the film is best worked at magnetic saturation, either in one direction or in the opposite direction. This makes for information storage without intermediate light values. Hence the unit lends itself readily to the storage of information in black-and-white form, e.g., in binary code. FIG. 3 illustrates simple apparatus for writing binary code information into the storage unit at a desired location which, for the sake of illustration, is likewise specified by binary code indications of its X and Y coordinates. The glass plate 11, bearing its sensitive film 12, is mounted in a jig 21 which is arranged to be driven in one coordinate direction by a motor 22. A needle-sharp stylus 23 of magnetizable material, bearing an energizing coil 24, is mounted in guides, not shown, above the jig 21 and arranged to be driven in the other coordinate direction by a motor 25. An incoming binary code signal (the "vertical address"), specifying the Y coordinate of a particular location on the film may be converted to an analog voltage by decoder 26. This voltage is converted by an amplifier 27 to a current which drives the motor 22 until the jig has reached the proper location with respect to the stylus. Similarly, a horizontal address in binary code form, specifying the X coordinate of the same location on the film, is converted to a corresponding voltage by decoder 28. An amplifier 29 converts this voltage into a current which drives the motor 25 and hence moves the stylus in the horizontal direction with respect to the jig. A feedback or servo system which may be of any desired variety and is schematically indicated for each motor by a motor-driven potentiometer and a return circuit to the decoder, causes rotation of the motors and movement of the stylus and the jig to cease when the stylus has thus been brought into juxtaposition with that part of the film which is designated by the horizontal and vertical addresses.

Information to be written into the storage unit may appear in the form of a serial binary code pulse group. Each pulse of this code group is applied through an amplifier 31 to the magnetizing coil 24 which surrounds the stylus 23, thus to reverse the magnetization vector of that part of the film with which the stylus is immediately juxtaposed. At the same time the stylus may be caused to scan a small portion of the film surface immediately adjacent to the point designated by the address signals. This scanning movement may be carried out by application to the horizontal address amplifier 29 of a supplementary sweep signal derived from a generator 32. The voltage sweep of this generator may be initiated by the output pulse of a trigger circuit 33 which responds to the first pulse of each incoming pulse group.

Information recorded at any point of the film surface may be erased by application to the magnetizing coil 24 of an erasing signal derived from an erasing generator 34. To erase any black mark it is only necessary to apply to the winding a current of polarity opposite to that which was employed to write the black mark in the first place, while continuous application of such current leaves unchanged those parts of the film on which information has not been recorded. Hence the erasing current may comprise a sequence of pulses or it may be continuous as desired.

Figure 4:
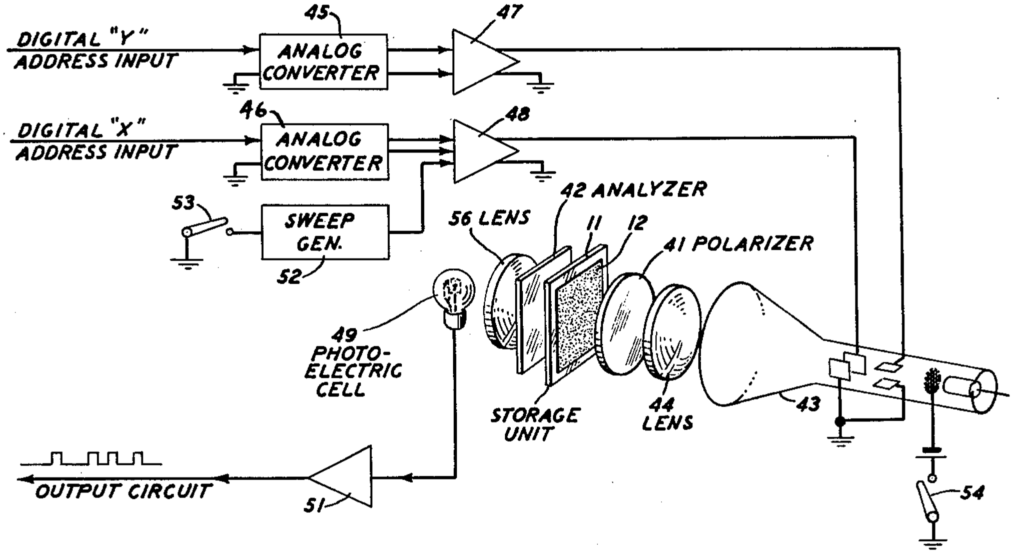
FIG. 4 is a schematic circuit diagram, partly in block form and partly in perspective, showing apparatus for reading information out of the storage unit and delivering it to a utilization circuit.

FIG. 4 shows, in highly schematic form, apparatus for reading out of the storage unit information which may have been written into it by apparatus such as that of FIG. 3 or otherwise. Here the storage unit comprising the glass backing plate 11 bearing its thin film 12 of manganese-bismuthide may be mounted between a conventional optical polarizer 41 and a conventional optical analyzer 42. A beam of light, originating in the bright spot which appears on the screen of a conventional cathode beam tube 43, is gathered by a condenser lens 44, restricted to vibrations in a single direction by the polarizer 41, and focused on the film 12.

The particular location of the film at which the spot of light impinges is determined by the location of the bright spot on the screen and hence by horizontal and vertical address signals appearing on input conductors. These signals may be similar, in all respects, to the address signals employed to position the stylus and jig in the apparatus of FIG. 3. Incoming binary code signals specifying, respectively, the X and Y coordinates (or "horizontal" and "vertical" addresses), may be converted to analog voltages in decoders 45 and 46 and applied by way of amplifiers 47 and 48 to the horizontal and vertical deflecting elements of the tube 43.

The spot of plane-polarized light, originating at a selected position on the cathode beam tube face, thus strikes a particular portion of the film on which information now to be read out has heretofore been stored. The reading-out process takes place by virtue of the Faraday rotation of the polarization plane which is in one direction through those parts of the film that are unaffected by the magnetic stylus and in the opposite direction through the affected parts. The analyzer 42 is preferably rotated through an angle $\beta$ with respect to the polarizer such that the light passing through the affected parts is totally extinguished. With films of the character described, the light passed by the unaffected parts is of ample strength to actuate a photoelectric cell 49 which then delivers a signal by way of an amplifier 51 to an output circuit.

Once the spot of plane-polarized light has been correctly located on the information storage film in response to the horizontal and vertical address signals as described above, the information stored in code form at that point may be read out by sweeping the spot laterally across the recorded information. To this end a sweep generator 52 is shown feeding the horizontal deflection circuit of the cathode beam tube, to be energized by closure of a manual switch 53 when the operator is ready to initiate the read-out operation. As indicated in connection with FIG. 3, if the stored information extends in the "Y" direction as well as in the "X" direction, the horizontal sweep may be supplemented by a vertical sweep of appropriately related frequency in the fashion now conventional in the television art. In either case, the sweep of the light spot across the stored code information results in the application to the photoelectric cell of a sequence of light pulses.

The output of the cell then consists of a like sequence of pulses of current and the group of such pulses reproduces the stored information as thus read out in serial pulse code form.

In order to prevent spurious signals from reaching the photo pickup unit the light source may be blanked out except when reading by conventional grid biasing techniques. A manual switch 54 is shown for the purpose.

Both the cathode beam tube blanking operation and the initiation of the sweep voltage may be automatically controlled by a suitable signal forming a portion of the address input signal.

The restriction of the film to information storage without intermediate light values does not necessarily restrict it to the storage of information in code form. Thus a conventional autograph signature or pen-and-ink drawing is represented by light values of only two kinds, black or white, yet is nevertheless not coded. By the same token the storage unit of the present invention is capable of accepting and storing a signature or a line drawing and of doing so on a very fine scale. Horizontal and vertical coordinate information derived, for example, from the horizontal and vertical movements of a conventional telautograph transmitter may be caused to move a magnetic stylus such as that of FIG. 3 over the surface of the storage unit in a path which exactly duplicates the path of the stylus at the transmitter station, the recording stylus being meanwhile continuously energized. The result is an exact small scale copy of the signature or drawing made at the transmitter station.

There exist many other materials having magnetic properties and which, if sufficiently thin, are transparent to light. In principle, any of these materials may form the basis of an information storage unit into which information can be written with a magnetic stylus and out of which it can be read by virtue of the Faraday rotation of the polarization plane of the incident light. The preferred material with which to practice the present invention is distinguished from the class of such materials generally in two significant particulars. First, its magnetization vector has a component which extends in a direction normal to the surface of the film. This makes for a storage unit which is most conveniently mounted in a plane normal to the incident light ray, and provides optimum contrast between the affected parts and the unaffected parts. Second, its coercivity, while sufficiently low to permit the ready writing of information with a strong magnetic stylus, is yet sufficiently high to render the film with its recorded information highly insensitive to the influence of stray magnetic fields.

What is claimed is:

1. An information storage unit comprising a crystalline film of substantial coercivity having a preferred axis of magnetization normal to the surface of said film, each individual area portion of said film which corresponds to a magnetic domain thereof being magnetized in a common direction normal to the surface of said film and being transparent to radiation, whereby reverse magnetization of preselected ones of said area portions may be employed to store information in said unit, the polarity of magnetization in each of said area portions being indicative of the information stored therein, and whereby each of said area portions, in dependence on the polarity of its magnetization vector may be utilized to rotate the polarization plane of incident, plane-polarized radiation in one sense or in an opposite sense.

2. An information storage unit comprising a magnetizable film of hexagonal lattice crystalline material of the nickel-arsenide type, each of the magnetic domains thereof having a single preferred axis of magnetization substantially normal to the surface of said film, each of said magnetic domains being magnetized to saturation to a state of common polarity in the direction of its respective preferred axis, and each individual area portion of said film corresponding to a respective one of said magnetic domains being transparent to plane-polarized radiation incident on said film, whereby reverse magnetization of preselected ones of said magnetic domains may be employed to store information in said unit, the polarity of magnetization in each of said domains being indicative of the information stored therein, and whereby each of said area portions, in dependence on the polarity of its magnetization vector, may be utilized to rotate the polarization plane of incident, plane-polarized radiation in one sense or in an opposite sense.

3. An information storage unit comprising a magnetizable film of hexagonal crystalline material, individual area portions thereof each being coincident with a respective magnetic domain which is magnetized to a state of common polarity along a preferred axis of magnetization substantially normal to the surface of said film, each of said area portions being capable of transmitting a first substantial fraction of plane-polarized radiation incident on said film and further being capable of reflecting a second substantial fraction of said radiation, whereby reverse magnetization of preselected ones of said magnetic domains may be employed to store information in said unit, the polarity of magnetization in each of said area portions being indicative of the information stored therein, and whereby each of said area portions, in dependence on the polarity of its magnetization vector, may be utilized to rotate the polarization plane of the transmitted radiation and of the reflected radiation in one sense or in an opposite sense.

4. An information storage unit comprising a material body which includes a film of hexagonal lattice crystalline structure which exhibits substantial coercivity, individual area portions of said film each corresponding to a respective magnetic domain thereof having a single preferred axis of magnetization substantially normal to the surface of said film, each of said individual area portions being capable of reflecting plane-polarized radiation incident thereon and being magnetized in a direction common with every other of said domains along its respective preferred axis of magnetization, whereby reverse magnetization of preselected ones of said area portions may be employed to store information in said unit, the polarity of magnetization each of said area portions being indicative of the information stored therein, and whereby each of said area portions, in dependence on the polarity of its magnetization vector, may be utilized to rotate the polarization plane of incident, plane-polarized radiation in one sense or in an opposite sense.

5. An information storage unit comprising a film of hexagonal lattice crystalline structure which exhibits substantial coercivity and which has a single preferred axis of magnetization normal to the surface of said film, said film being divisible into individual area portions each corresponding to a respective magnetic domain transparent to radiation and uniformly magnetized to a condition of common polarity in a direction normal to the surface of said film, whereby reverse magnetization of preselected ones of said area portions may be employed to store information in said unit, the polarity of magnetization in each of said area portions being indicative of the information stored therein, and whereby each of said area portions, in dependence on the polarity of its magnetization vector, may be utilized to rotate the polarization plane of incident, plane-polarized radiation in one sense or in an opposite sense.

6. An information storage unit comprising a film of crystalline manganese-bismuthide having a single preferred axis of magnetization substantially normal to the surface of said film, the thickness of said film being proportioned to transmit a substantial fraction of plane-polarized light incident thereon, and each individual area portion of said film corresponding to a magnetic domain thereof being magnetized in the same direction substantially normal to the surface of said film, whereby reverse magnetization of preselected ones of said area portions may be employed to store information in said unit, the polarity of magnetization in each of said area portions being indicative of the information stored therein, and whereby each of said area portions, in dependence on the polarity of its magnetization vector, may be utilized to rotate the polarization plane of incident, plane-polarized radiation through a substantial angle in one sense or in an opposite sense.

7. An information storage unit comprising a film of magnetizable crystalline manganese-bismuthide, the crystals of which the film is composed being so oriented that their optic axes are substantially perpendicular to the surface of the film, and each individual area portion of said film corresponding to a respective magnetic domain thereof being magnetized to a common polarity in a direction normal to the surface of said film.

8. An information storage unit comprising a transparent film of magnetizable crystalline manganese-bismuthide, the crystals of which the film is composed being so oriented that their optic axes are substantially perpendicular to the surface of the film, and each individual area portion of said film corresponding to a magnetic domain thereof being magnetized to a common polarity state of magnetization in a direction normal to the surface of said film.

9. An information storage unit comprising a transparent film of magnetizable hexagonal lattice crystalline compound of manganese, the crystals of which the film is composed being so oriented that their axes of easy magnetization are substantially perpendicular to the surface of said film, and each individual area portion of said film corresponding to a magnetic domain thereof being magnetized to a common polarity state of magnetization in a direction substantially normal to the surface of said film.

10. An information storage unit comprising a transparent film of a magnetizable hexagonal lattic crystalline compound of bismuth, the crystals of which said film is composed being so oriented that their axes of easiest magnetization are substantially perpendicular to the surface of said film, and each individual area portion of said film corresponding to a magnetic domain thereof being magnetized to a state of common polarity magnetization in a common direction normal to the surface of said film.

11. An information storage unit comprising a film of magnetic material affixed to a transpartent nonmagnetic material, said film having a single preferred axis of magnetization substantially normal to the surface of said film, and individual area portions of said film each corresponding to a respective magnetic domain thereof having a substantial coercivity and being magnetized to a state of common polarity magnetization in a direction substantially normal to the surface of said film, whereby reverse magnetization of preselected ones of said area portions may be employed to store information in said unit, the polarity of magnetization in each of said area portions being indicative of the information stored therein, and whereby each of said area portions, in dependence on the polarity of its magnetization vector, may be utilized to rotate the polarization plane of incident, plane-polarized radiation through a substantial angle in one sense or in an opposite sense.

12. An information storage unit comprising a transparent film of a magnetizable hexagonal lattice crystalline material affixed to a supporting transparent structure, the crystals of said film being so oriented that their axes of easiest magnetization are substantially perpendicular to the surface of said film, and each individual area portion of said film corresponding to a respective magnetic domain thereof being magnetized in a common direction normal to the surface of said film, thereby uniformly orienting the magnetic vectors of said magnetic domains, whereby reverse magnetization of preselected ones of said magnetic domains may be employed to store information in said unit, the polarity of magnetization in each of said magnetic domains being indicative of the information stored therein.

13. An information storage unit comprising a film of hexagonal lattice crystalline material having a single preferred axis of magnetization disposed at a predetermined angle to the surface of said film, each individual area portion of said film corresponding to a respective magnetic domain thereof being magnetized to a state of common polarity magnetization in a direction substantially parallel to said preferred axis, thereby uniformly orienting the magnetic vectors of said magnetic domains, and each of said individual area portions being transparent to plane-polarized radiation incident on said film, whereby reverse magnetization of preselected ones of said magnetic domains may be employed to store information in said unit, the polarity of magnetization in each of said magnetic domains being indicative of the information stored therein, and whereby each of said area portions, in dependence on the polarity of its magnetization vector, may be utilized to rotate the polarization plane of incident, plane-polarized radiation through a substantial angle in one sense or in an opposite sense.

References Cited in the file of this patent

UNITED STATES PATENTS

| | | |
|---|---|---|
| 2,013,559 | Gordon | Sept. 3, 1935 |
| 2,072,419 | Birch-Field | Mar. 2, 1937 |
| 2,270,323 | Land et al. | Jan. 20, 1942 |
| 2,485,839 | O'Dea | Oct. 25, 1949 |
| 2,493,200 | Land | Jan. 3, 1950 |
| 2,644,031 | Klyce | June 30, 1953 |
| 2,820,956 | Rueger | Jan. 21, 1958 |
| 2,830,285 | Davis et al. | Apr. 8, 1958 |

FOREIGN PATENTS

| | | |
|---|---|---|
| 873,256 | Germany | Apr. 13, 1953 |

OTHER REFERENCES

"Preparation of Thin Magnetic Films and Their Properties," Blois, Journal of Applied Physics, vol. 26, No. 8, August 1955, pages 975–980.

Physical Review, vol. 104, No. 2, Oct. 15, 1956, pages 552–553.

Physical Review, vol. 104, No. 3, Nov. 1, 1956, pages 645–649.